United States Patent
Higginbotham

(10) Patent No.: US 9,476,687 B2
(45) Date of Patent: Oct. 25, 2016

(54) TAPE RULE ACCESSORY

(71) Applicant: Scott Higginbotham, Chandler, AZ (US)

(72) Inventor: Scott Higginbotham, Chandler, AZ (US)

(*) Notice: Subject to any disclaimer, the term of this patent is extended or adjusted under 35 U.S.C. 154(b) by 140 days.

(21) Appl. No.: 14/622,895

(22) Filed: Feb. 15, 2015

(65) Prior Publication Data

US 2015/0233691 A1    Aug. 20, 2015

Related U.S. Application Data

(60) Provisional application No. 61/942,184, filed on Feb. 20, 2014.

(51) Int. Cl.
*G01B 3/10* (2006.01)

(52) U.S. Cl.
CPC ..... *G01B 3/1061* (2013.01); *G01B 2003/1066* (2013.01); *G01B 2003/1092* (2013.01)

(58) Field of Classification Search
CPC ............... G01B 3/1061; G01B 2003/1092; G01B 2003/1066
USPC .................................. 33/486, 487, 488, 770
See application file for complete search history.

(56) References Cited

U.S. PATENT DOCUMENTS

| | | | | |
|---|---|---|---|---|
| 1,806,422 A * | 5/1931 | Shaen | ...................... | G01B 3/02 235/70 B |
| 2,591,333 A | 4/1932 | Bellmer | | |
| 2,396,877 A | 3/1946 | Peterson | | |
| 2,549,503 A * | 4/1951 | McCully | .............. | G01B 3/1071 33/760 |
| 2,621,409 A | 12/1952 | Dvorak | | |
| 2,736,097 A * | 2/1956 | Coleman, Jr. | ............ | G01B 3/02 235/70 B |
| 3,100,937 A * | 8/1963 | Burch | .................. | G01B 3/1041 33/770 |
| 3,289,305 A | 12/1966 | Norton | | |
| 4,507,869 A | 4/1985 | Stude | | |
| 4,603,481 A * | 8/1986 | Cohen | .................. | G01B 3/1005 242/380 |
| 5,458,946 A | 10/1995 | White, Jr. | | |
| 5,606,803 A | 3/1997 | O'Sullivan | | |
| 6,497,050 B1 * | 12/2002 | Ricalde | ..................... | B25H 7/04 33/668 |
| 7,263,785 B2 | 9/2007 | Sullivan | | |
| 7,900,370 B1 | 3/2011 | Treige | | |
| 8,225,520 B2 * | 7/2012 | Rabin | ...................... | G01C 9/34 33/613 |

(Continued)

FOREIGN PATENT DOCUMENTS

IL    WO2013150531 A1    10/2013

*Primary Examiner* — G. Bradley Bennett
(74) *Attorney, Agent, or Firm* — Keith L. Jenkins, Registered Patent Attorney, LLC; Keith L. Jenkins

(57) ABSTRACT

A tape rule accessory with a receiving slot that is shaped conformally to the curvature of a tape rule for receiving a tape rule side edge into the receiving slot. The upper flange has a window with opposed and aligned alignment pointers for aligning to demarcations on the tape rule when the tape rule is installed in the receiving slot. The alignment pointers are positioned an integer number of units of length (for example, inches or centimeters) from an end of the accessory. Exterior marking guides are aligned to the alignment pointers. One or more level indicators, such as spirit levels, may be attached, preferably by being snap fit into housings. Friction ridges may be used within the receiving slot to prevent accidental movement while maintaining ease of use. A thermally bonded, two-part embodiment is disclosed.

20 Claims, 15 Drawing Sheets

(56) References Cited

U.S. PATENT DOCUMENTS

| | | | |
|---|---|---|---|
| 2002/0129511 A1* | 9/2002 | Laughlin | G01B 3/1071 33/770 |
| 2010/0115777 A1* | 5/2010 | Lee | B43L 9/045 33/27.01 |
| 2012/0073155 A1 | 3/2012 | Mabey | |
| 2015/0075022 A1* | 3/2015 | Bitton | B25H 7/04 33/760 |
| 2016/0047642 A1* | 2/2016 | Zhou | G09F 9/301 33/760 |

* cited by examiner

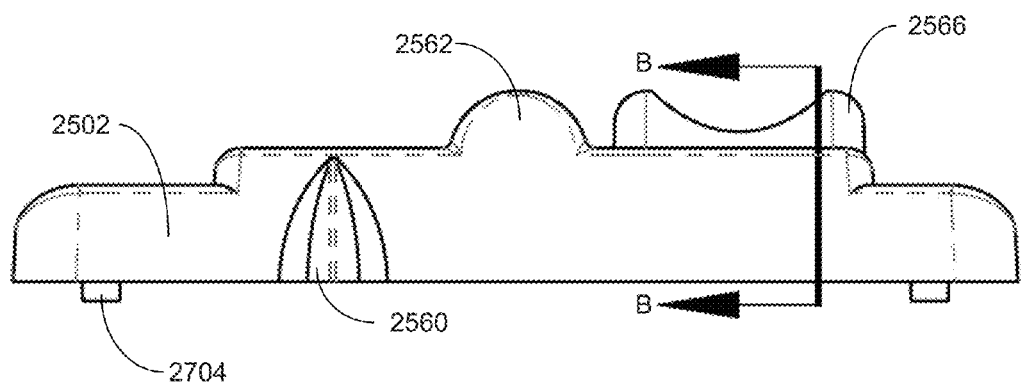
FIG. 34
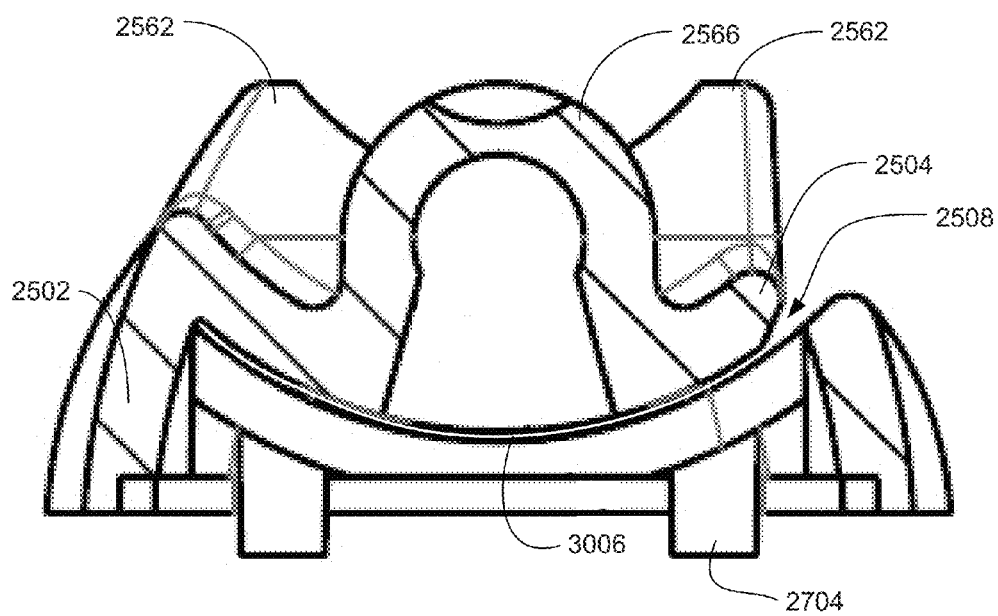

TAPE RULE ACCESSORY

RELATED APPLICATIONS

This application claims the benefit of U.S. provisional patent application Ser. No. 61/942,184 filed 20 Feb. 2014 to one common inventor.

TECHNICAL FIELD

The present invention relates to accessories that attach to a flexible extendable tape rule, such as those tape rules that are stored wound on a spool. The present invention more particularly relates to such an accessory that assists in marking and leveling.

BACKGROUND

While extendable tape rules provide great convenience for storing a tape, the flexible tape is sometimes difficult to stabilize when it is time to mark a measured workpiece or the like. Several attempts have been made to solve this problem without noticeable commercial success. As a result, there is a need for a stabilizing accessory for the tape.

When measuring the distance between two vertical columns, it is important that the tape be held level (perpendicular to both vertical columns) in order to get an accurate measurement. Conventionally, a large carpenter's level must be used in conjunction with the tape rule to get an accurate measurement. Accordingly, there is a need for a tape rule accessory that assists with leveling.

OBJECTS AND FEATURES OF THE INVENTION

A primary object and feature of the present invention is to overcome the above mentioned problems and fulfill the above-mentioned needs.

Another object and feature of the present invention is to provide a tape rule accessory that fits easily and snugly onto the tape rule.

Another object and feature of the present invention is to provide a tape rule accessory that stabilizes a small portion of the tape rule in order to assist in marking a workpiece or the like.

Another object and feature of the present invention is to provide a tape rule accessory that includes a spirit level to assist in leveling the tape rule during a measurement.

Another object and feature of the present invention is to provide a tape rule accessory that is small, lightweight, and durable.

Another object and feature of the present invention is to provide a tape rule accessory that is easy and economical to manufacture.

It is an additional primary object and feature of the present invention to provide such a system that is replaceable, effective, and handy. Other objects and features of this invention will become apparent with reference to the following descriptions.

SUMMARY OF THE INVENTION

A tape rule accessory with a receiving slot that is shaped conformally to the curvature of a tape rule for receiving a tape rule side edge into the receiving slot. The upper flange has a window with opposed and aligned alignment pointers for aligning to demarcations on the tape rule when the tape rule is installed in the receiving slot. The alignment pointers are positioned an integer number of units of length (for example, inches or centimeters) from an end of the accessory. Exterior marking guides are aligned to the alignment pointers. One or more level indicators, such as spirit levels, may be attached, preferably by being snap fit into housings. Friction ridges may be used within the receiving slot to prevent accidental movement while maintaining ease of use. A thermally bonded, two-part embodiment is disclosed.

BRIEF DESCRIPTION OF THE DRAWINGS

The present invention will hereinafter be described in conjunction with the following drawing figures, wherein like numerals denote like elements.

FIG. 34 is a side elevation view illustrating the top portion of the seventh exemplary embodiment of the tape rule accessory of FIG. 25 and defining a cross sections BB, according to a preferred embodiment of the present invention;

FIG. 35 is a cross-sectional view illustrating the top portion of the seventh exemplary embodiment of the tape rule accessory of FIG. 25 and through cross sections BB of FIG. 34, according to a preferred embodiment of the present invention;

DETAILED DESCRIPTION OF THE INVENTION

Figure 1:
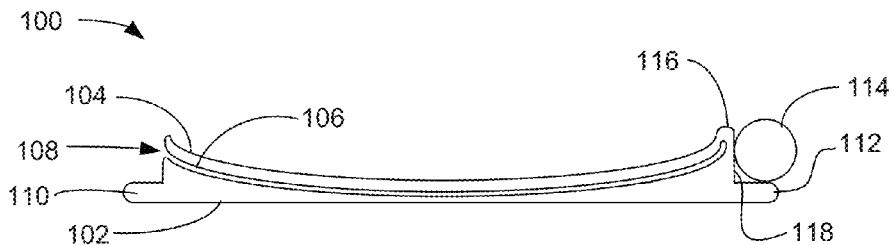
FIG. 1 is a first end elevation view illustrating a first exemplary embodiment of a tape rule accessory, according to a preferred embodiment of the present invention.

FIG. 1 is a first end elevation view illustrating a first exemplary embodiment of a tape rule accessory 100, according to a preferred embodiment of the present invention. Tape rule accessory 100 includes base 102 with side flanges 110 and 112. Base 102 is preferably flat for stabilizing the tape rule 902 (see FIGS. 9-10) against a flat workpiece, such as lumber, a wall, or the like. Vertical side surface 118 extends upward to bend 116 that further extends into top flange 104. Bend 116 preferably has some flexibility and resilience, as does top flange 104. Preferably, the tape rule accessory 100 is made of one piece. For example, machined metal is a suitable material. In various other embodiments, other materials may be used. A receiving slot 106 is formed between base 102 and top flange 104 for receiving a tape rule 902 (see FIG. 9) through slot opening 108. The slot 106 is sized to frictionally engage the top and bottom surfaces of the tape rule 902. Preferably, the side-to-side dimension of the receiving slot 106 is slightly less wide than the tape rule 902 (see FIG. 10), other embodiments may be wider or narrower. A level indicator 114, exemplified as a cylindrical spirit level 114 is fixed to vertical surface 118 and flange 112 by adhesive or similarly effective means. For example, in a particular embodiment, a resilient snap-fit fixture may receive the cylindrical spirit level 114, thereby assisting in correct alignment to the tape rule accessory 100. In operation, pressure along the tape rule 902 on top flange 104, as by thumb, slides the tape rule accessory 100 along tape rule 902.

Figure 2:
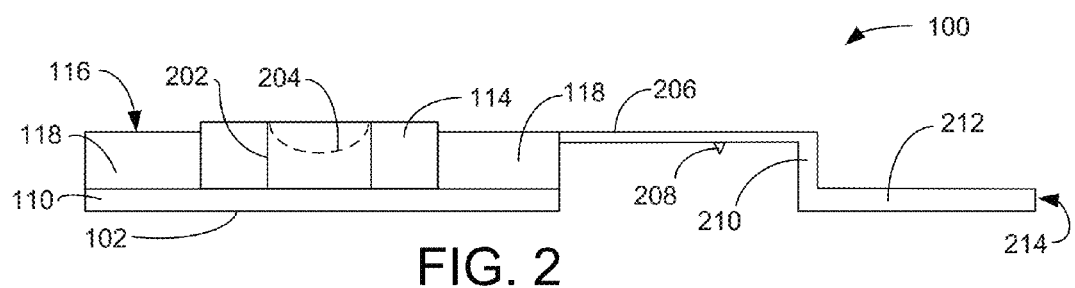
FIG. 2 is a first side elevation view illustrating the first exemplary embodiment of the tape rule accessory of FIG. 1, according to a preferred embodiment of the present invention.

FIG. 2 is a first side elevation view illustrating the first exemplary embodiment of the tape rule accessory 100 of FIG. 1, according to a preferred embodiment of the present invention. Spirit level 114 has one or more delineations 202 (one of two labeled) for reference to the position of bubble 204. Bridge arms 206 (see also FIGS. 5 and 6) extend to fin 210 and support Alignment pointers 208 (see also FIGS. 5 and 6) that extend diagonally downward and inward. Alignment pointers 208 are exemplary and various devices may be used, within the constraint that the Alignment pointers 208 extend from both sides of window 504 (see FIG. 5). For example, a transparent covering for window 504 having a thin red line extending across the covering would serve. Fin 210 extends downward to base extension 212. The end surface 214 of base extension 212 is one tape rule 902 length unit 602 (see FIG. 6) (e.g. inch or centimeter) from alignment pointers 208.

Figure 3:
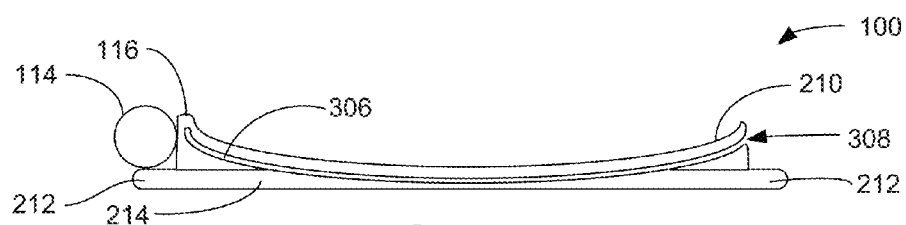
FIG. 3 is a second end elevation view illustrating the first exemplary embodiment of the tape rule accessory of FIG. 1, according to a preferred embodiment of the present invention.

FIG. 3 is a second end elevation view illustrating the first exemplary embodiment of the tape rule accessory 100 of FIG. 1, according to a preferred embodiment of the present invention. End surface 214 can be used as a marking guide. Receiving slot 306 is aligned with receiving slot 106 and is located in fin 210. Slot opening 308 is aligned with slot opening 108.

Figure 4:
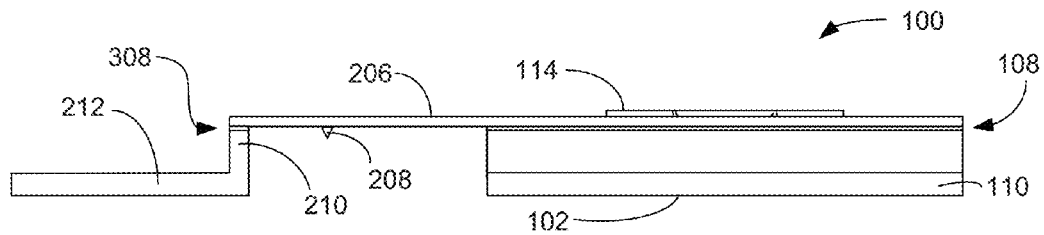
FIG. 4 is a second side elevation view illustrating the first exemplary embodiment of the tape rule accessory of FIG. 1, according to a preferred embodiment of the present invention.

FIG. 4 is a second side elevation view illustrating the first exemplary embodiment of the tape rule accessory 100 of FIG. 1, according to a preferred embodiment of the present invention. Fin 210 has a slot opening 308 which aligns to slot opening 108.

Figure 5:
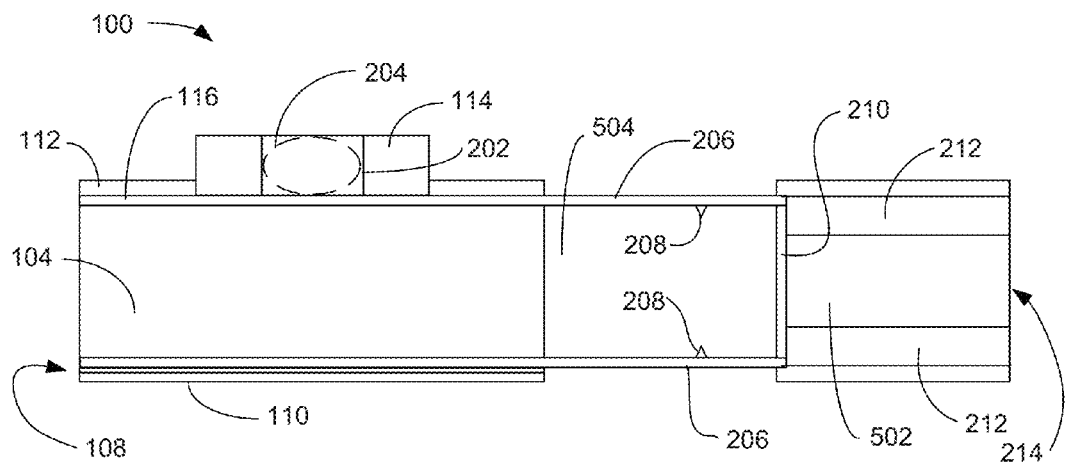
FIG. 5 is a top plan view illustrating the first exemplary embodiment of the tape rule accessory of FIG. 1, according to a preferred embodiment of the present invention.

FIG. 5 is a top plan view illustrating the first exemplary embodiment of the tape rule accessory 100 of FIG. 1, according to a preferred embodiment of the present invention. Fin 210 and top flange 104, along with bridge members 206, create a window 504 (see FIG. 5) in which a portion of the tape rule 902 can be seen and aligned to the Alignment pointers 208. Depression 502 has a curvature that conforms to the curvature of the tape rule 902. Two opposed alignment pointers are used to align with tape rule delineations 904 (see FIG. 9) on opposing edges of tape rule 902 to reduce errors due to the tape rule 902 possibly being at a slight angle within the tape rule accessory 100. When both alignment pointers are aligned to corresponding delineations 904 on both edges of tape rule 902, then the tape rule 902 is properly aligned in the tape rule accessory 100.

Figure 6:
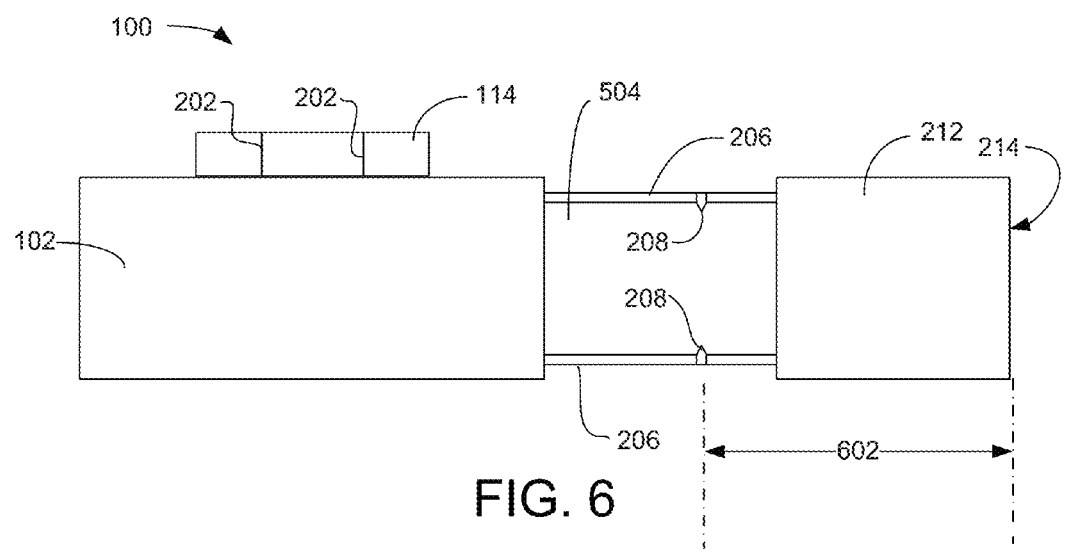
FIG. 6 is a bottom plan view illustrating the first exemplary embodiment of the tape rule accessory of FIG. 1, according to a preferred embodiment of the present invention.

FIG. 6 is a bottom plan view illustrating the first exemplary embodiment of the tape rule accessory 100 of FIG. 1, according to a preferred embodiment of the present invention. It can be seen that alignment pointers 208 are one length unit 602 from end surface 214 of base extension 212. It can further be seen that alignment pointers 208 are affixed, or integral with, the bottom surface of bridge members 206.

Figure 7:
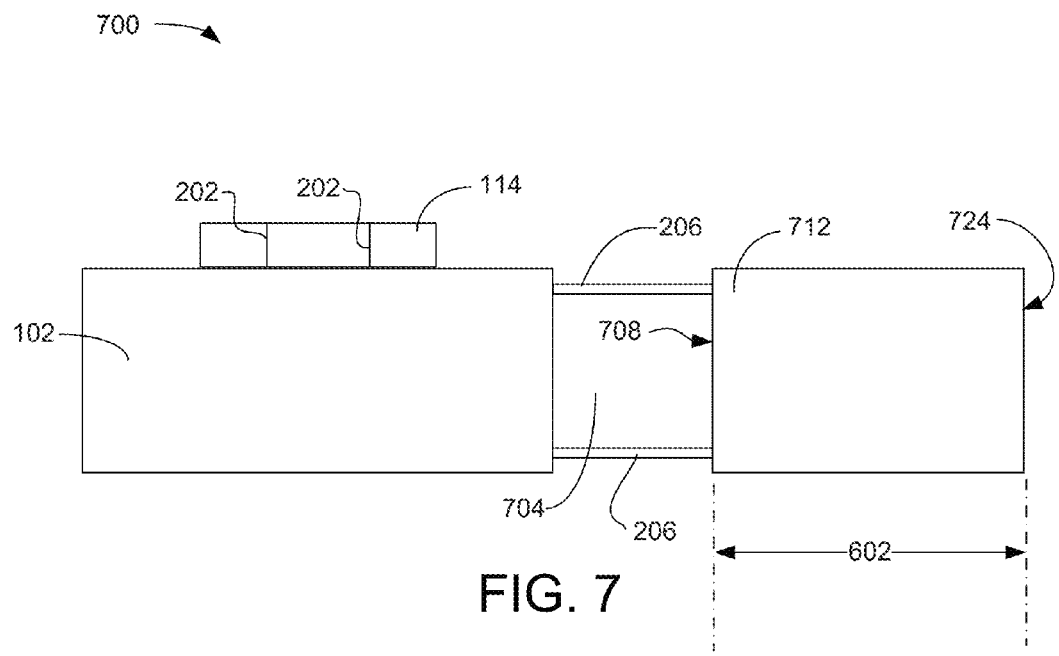
FIG. 7 is a bottom plan view illustrating a second exemplary embodiment of the tape rule accessory, according to a preferred embodiment of the present invention.

FIG. 7 is a bottom plan view illustrating a second exemplary embodiment of the tape rule accessory 700, according to a preferred embodiment of the present invention. Base extension 712 has been extended to position inner surface 708 of base extension as the alignment feature, or alignment edge. Base extension 712 is one length unit 602 (e.g. inch or centimeter) long between alignment edge 708 and marking guide surface 724. Window 704 is smaller than window 504. Alignment edge 708 enables aligning delineations 904 on both opposing edges of tape rule 902.

Figure 8:
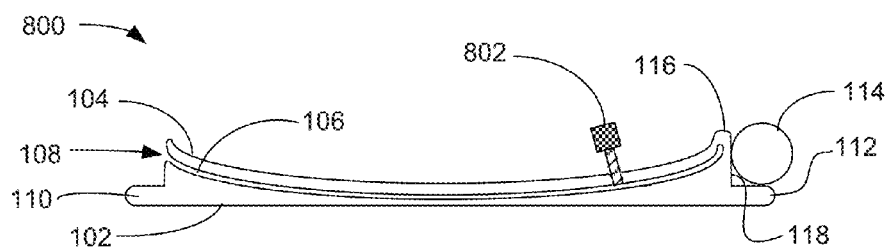
FIG. 8 is a first end elevation view illustrating a third exemplary embodiment of the tape rule accessory, according to a preferred embodiment of the present invention.

FIG. 8 is a first end elevation view illustrating a third exemplary embodiment of the tape rule accessory 800, according to a preferred embodiment of the present invention. A clamping device, or lock, shown as set screw 802, can be used to releasably fix the tape rule accessory 800 to the tape 902. In the illustrated example, set screw 802 is threaded through a threaded bore in top flange 104 to secure the tape rule 902 in place. Those of skill in the art, enlightened by the present disclosure, will be aware of various clamping devices that may be used in place of set screw 802. Any of the embodiments 100, 700, 800, 1100, 1300, 1900, and 2500 and embodiments not exemplified, may use a clamping device, such as set screw 802. Likewise, any of the embodiments 100, 700, 800, 1100, 1300, 1900, and 2500, and embodiments not exemplified, may have a level indicator 114 attached.

Figure 9:
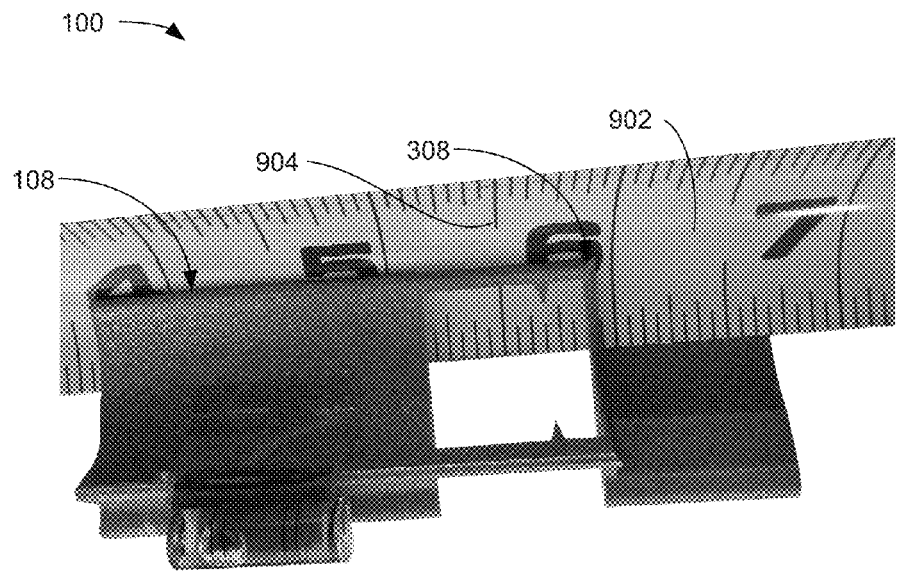
FIG. 9 is a perspective view illustrating the first exemplary embodiment of the tape rule accessory of FIG. 1 being mounted onto a tape rule, according to a preferred embodiment of the present invention.

FIG. 9 is a perspective view illustrating the first exemplary embodiment of the tape rule accessory 100 of FIG. 1 being mounted onto a tape rule 902, according to a preferred embodiment of the present invention. A side edge of the tape rule 902 is inserted into slot openings 108 and 308 and the tape rule 902 is pushed sideways into slots 106 and 306.

Figure 10:
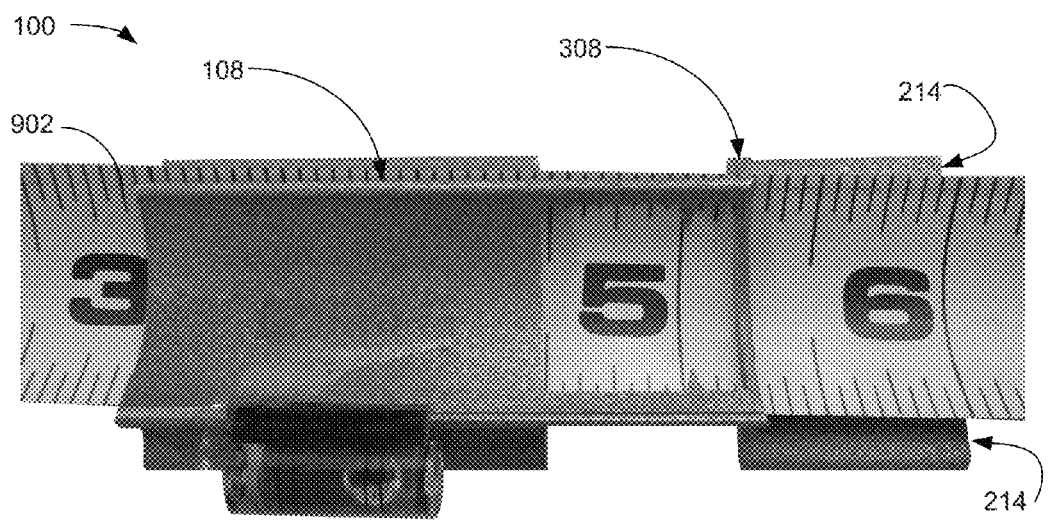
FIG. 10 is a perspective view illustrating the first exemplary embodiment of the tape rule accessory of FIG. 1 mounted on a tape rule, according to a preferred embodiment of the present invention.

FIG. 10 is a perspective view illustrating the first exemplary embodiment of the tape rule accessory 100 of FIG. 1 mounted on a tape rule 902, according to a preferred embodiment of the present invention. The tape rule accessory 100 is shown installed on the tape rule 902. It can be seen that the distance from alignment pointers 208 to end surface 214 is one inch, or one tape rule 902 length increment.

Figure 11:
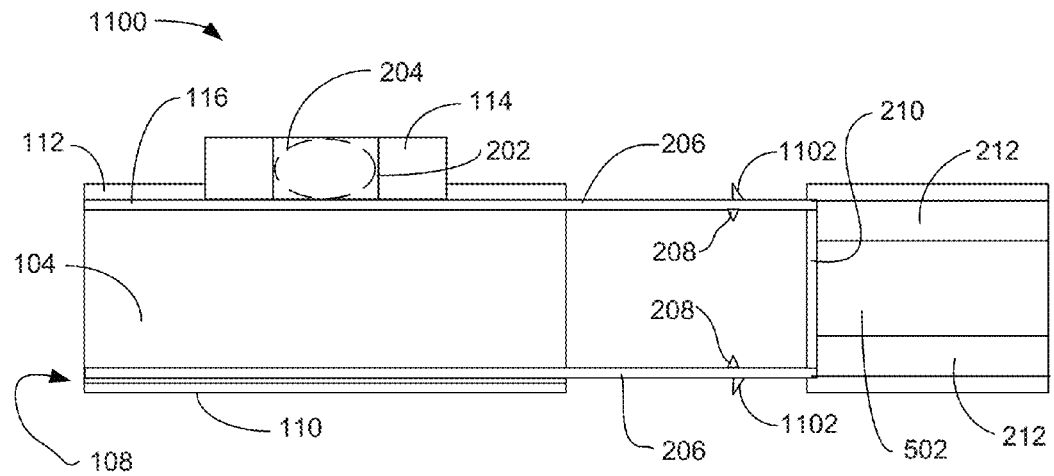
FIG. 11 is a top plan view illustrating a fourth exemplary embodiment of the tape rule accessory, according to a preferred embodiment of the present invention.

FIG. 11 is a top plan view illustrating a fourth exemplary embodiment of the tape rule accessory 1100, according to a preferred embodiment of the present invention. Marking guides 1102 have been added to tape rule accessory 100 and aligned to alignment pointers 208 to provide marking without offset.

Figure 12:
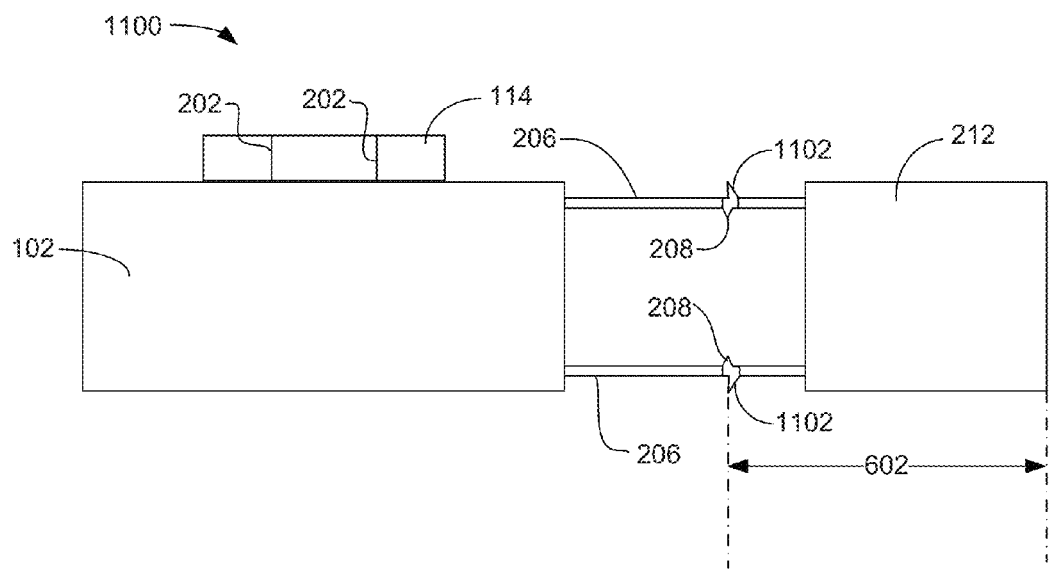
FIG. 12 is a bottom plan view illustrating the fourth exemplary embodiment of the tape rule accessory of FIG. 11, according to a preferred embodiment of the present invention.

FIG. 12 is a bottom plan view illustrating the fourth exemplary embodiment of the tape rule accessory 1100 of FIG. 11, according to a preferred embodiment of the present invention. Alignment pointers 208 and marking guides 1102 are shown as being made of one piece.

Figure 13:
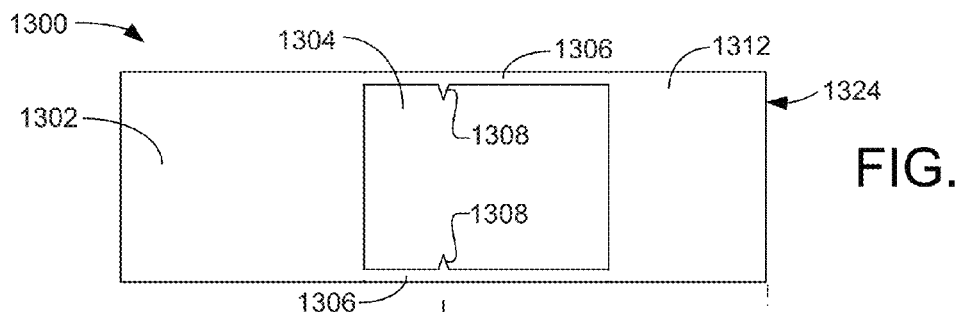
FIG. 13 is a top plan view illustrating a fifth exemplary embodiment of the tape rule accessory, according to a preferred embodiment of the present invention.

FIG. 13 is a top plan view illustrating a fifth exemplary embodiment of the tape rule accessory 1300, according to a preferred embodiment of the present invention. Window 1304 is formed by base 1302, base extension 1312, and bridge members 1306 with alignment pointers 1308. The length unit 1320 is defined by the outer edge 1324 of base extension and the alignment pointers 1308. Bridge members 1306 extend between base 1302 and base extension 1312. In an additional embodiment, tape rule accessory 1300 has a level indicator 114 attached and aligned to assist with leveling the tape rule 902.

Figure 14:
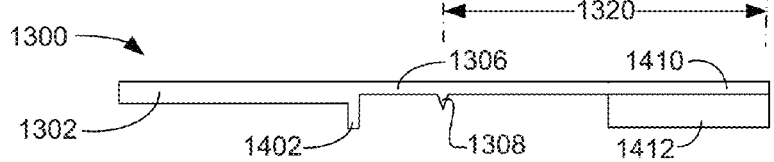
FIG. 14 is a first side elevation view illustrating the fifth exemplary embodiment of the tape rule accessory of FIG. 13, according to a preferred embodiment of the present invention.

FIG. 14 is a first side elevation view illustrating the fifth exemplary embodiment of the tape rule accessory 1300 of FIG. 13, according to a preferred embodiment of the present invention. Fin 1402 extends downward along an edge portion of the underside of base 1302 adjacent window 1304 and one bridge member 1306. Bridge member extends from base member 1302 to form edge 1410. Arcuate lower member 1412 (see also FIG. 15) extends from edge 1410 to form slot 1506 (see FIG. 15) between base extension 1312 and arcuate lower member 1412.

Figure 15:
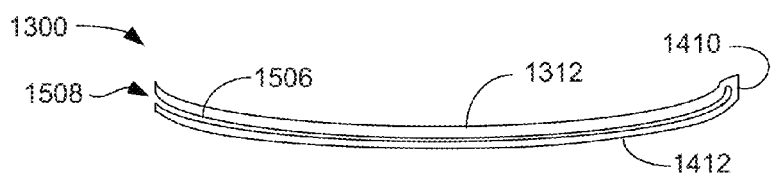
FIG. 15 is a first end elevation view illustrating the fifth exemplary embodiment of the tape rule accessory of FIG. 13, according to a preferred embodiment of the present invention.

FIG. 15 is a first end elevation view illustrating the fifth exemplary embodiment of the tape rule accessory 1300 of FIG. 13, according to a preferred embodiment of the present invention. Lower member 1412 extends arcuately below base extension 1312 to form slot 1506 with opening 1508.

Figure 16:
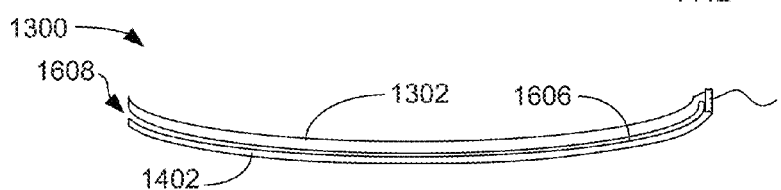
FIG. 16 is a second end elevation view illustrating the fifth exemplary embodiment of the tape rule accessory of FIG. 13, according to a preferred embodiment of the present invention.

FIG. 16 is a second end elevation view illustrating the fifth exemplary embodiment of the tape rule accessory 1300 of FIG. 13, according to a preferred embodiment of the present invention. Fin 1402 extends arcuately below base 1302 to form slot 1606 with opening 1608. Ridge 1602 provides a stop for the inserted edge of tape rule 902.

Figure 17:
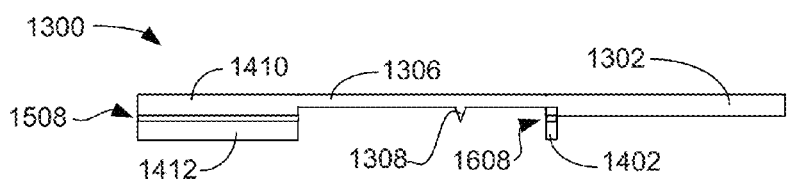
FIG. 17 is a second side elevation view illustrating the fifth exemplary embodiment of the tape rule accessory of FIG. 13, according to a preferred embodiment of the present invention.

FIG. 17 is a second side elevation view illustrating the fifth exemplary embodiment of the tape rule accessory 1300 of FIG. 13, according to a preferred embodiment of the present invention. Two slots 1506 and 1606 with openings 1508 and 1608, respectively, bracket window 1304 to hold the tape rule 902 steady within the window 1304 when installed.

Figure 18:
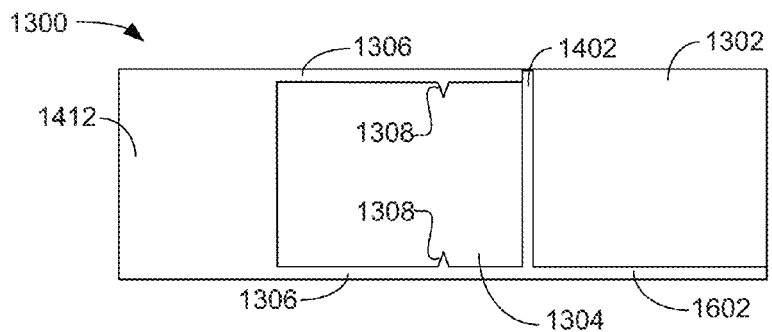
FIG. 18 is a bottom plan view illustrating the fifth exemplary embodiment of the tape rule accessory of FIG. 13, according to a preferred embodiment of the present invention.

FIG. 18 is a bottom plan view illustrating the fifth exemplary embodiment of the tape rule accessory 1300 of FIG. 13, according to a preferred embodiment of the present invention. Fin 1402 can be more clearly seen crossing base extension 1302 adjacent window 1304. Ridge 1602 can be better understood to stop the edge of the tape rule 902 when the tape rule 902 is installed.

Figure 19:
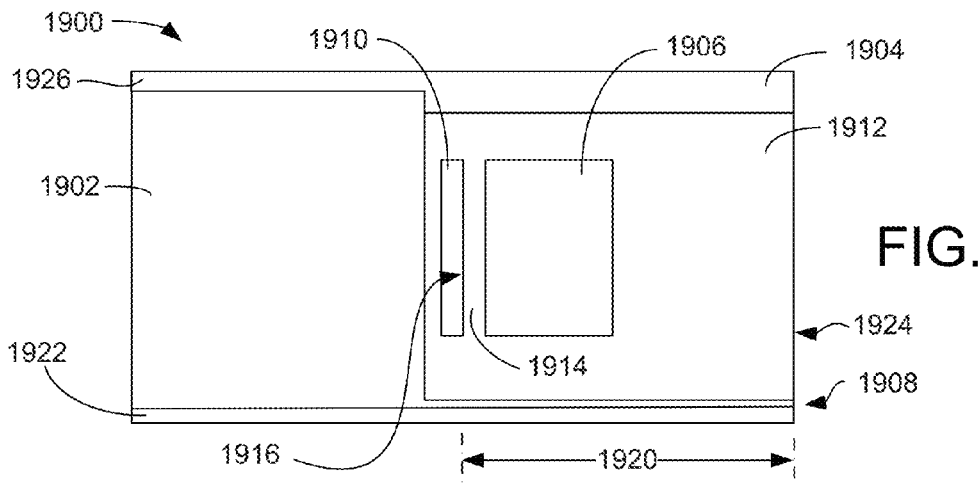
FIG. 19 is a top plan view illustrating a sixth exemplary embodiment of the tape rule accessory, according to a preferred embodiment of the present invention.

FIG. 19 is a top plan view illustrating a sixth exemplary embodiment of the tape rule accessory 1900, according to a preferred embodiment of the present invention. The alignment feature 1916 is an edge of window 1910 and is one length unit 1920 from end 1924 of base 902. Alignment bar 1914 extends across top flange 1912 and separates window 1910 from window 1906. Top flange 1912 extends from edge 1904 to slot opening 1908 formed by lip 1922 and an edge of top flange 1912. Edge 1904 narrows to edge 1926 along base 1902. In operation, tape rule 902 is inserted into slot opening 1908 to mount the tape rule accessory 1900 onto tape rule 902. Window 1910 is used for its alignment feature edge 1916 and window 1906 is used to provide enhanced view of the tape rule 902, when installed. In an additional embodiment, tape rule accessory 1900 has a level indicator 114 attached and aligned to assist with leveling the tape rule 901.

Figure 20:
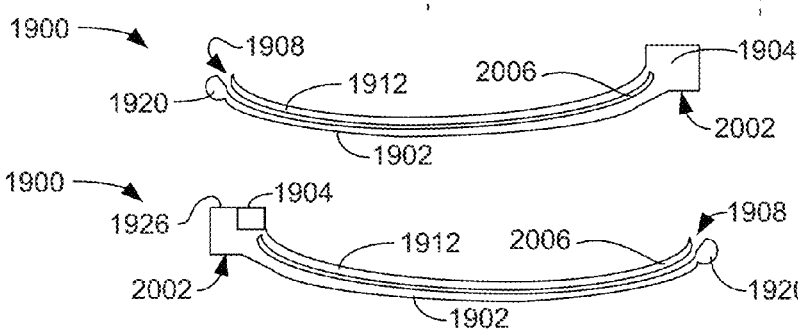
FIG. 20 is a first end elevation view illustrating the sixth exemplary embodiment of the tape rule accessory of FIG. 19, according to a preferred embodiment of the present invention.

FIG. 20 is a first end elevation view illustrating the sixth exemplary embodiment of the tape rule accessory 1900 of FIG. 19, according to a preferred embodiment of the present invention. Top flange 1912 extends spaced apart from base 1902 to form arcuate slot 2006 with opening 1908. Arcuate base 1902 terminates in lip 1920. In a preferred embodiment, base 1902 has a flat bottom surface portion for stabilizing the tape rule 902 from rocking. Edge 1904 has an underside surface 2002.

Figure 21:
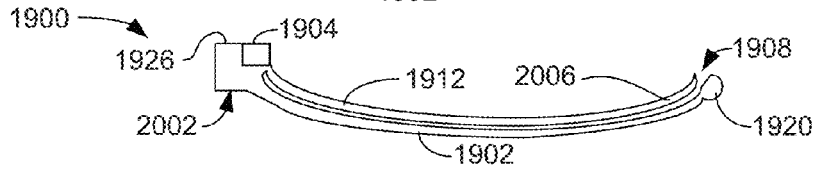
FIG. 21 is a second end elevation view illustrating the sixth exemplary embodiment of the tape rule accessory of FIG. 19, according to a preferred embodiment of the present invention.

FIG. 21 is a second end elevation view illustrating the sixth exemplary embodiment of the tape rule accessory 1900 of FIG. 19, according to a preferred embodiment of the present invention. The notch formed by the narrowing of edge 1904 into edge 1926 can be more clearly seen. Tape rule accessory 1900 has only one slot 2006.

Figure 22:
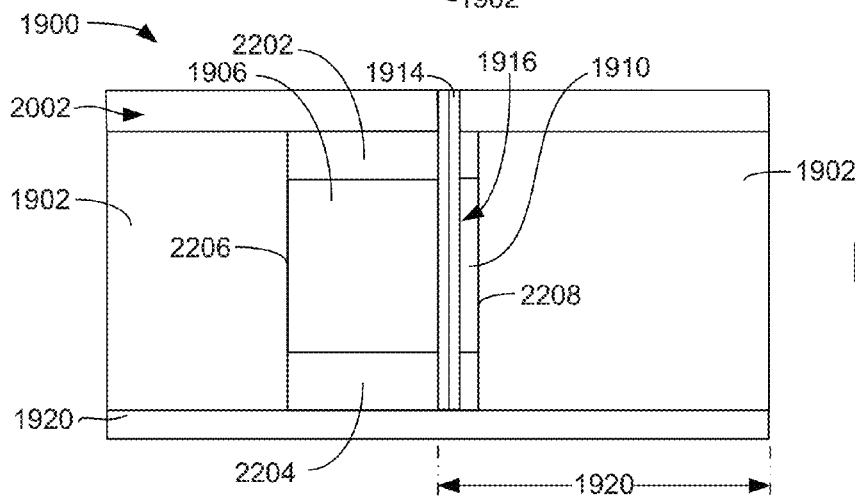
FIG. 22 is a bottom plan view illustrating the sixth exemplary embodiment of the tape rule accessory of FIG. 19, according to a preferred embodiment of the present invention.

FIG. 22 is a bottom plan view illustrating the sixth exemplary embodiment of the tape rule accessory 1900 of FIG. 19, according to a preferred embodiment of the present invention. Alignment bar has a triangular cross section (see FIGS. 23 and 24). Base 1902 extends from edge underside surface 2002 and is partially cut out at lines 2206 and 2208 leaving portions 2202 and 2204 to further define windows 1906 and 1910.

Figure 23:
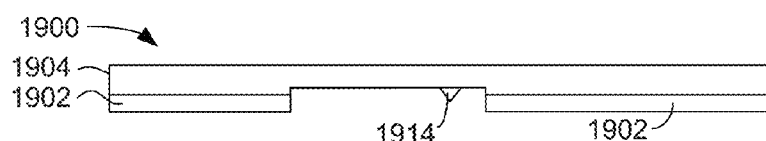
FIG. 23 is a first side elevation view illustrating the sixth exemplary embodiment of the tape rule accessory of FIG. 19, according to a preferred embodiment of the present invention.

FIG. 23 is a first side elevation view illustrating the sixth exemplary embodiment of the tape rule accessory 1900 of FIG. 19, according to a preferred embodiment of the present invention. This figure illustrates the edge 1904 view, with the partial cut out of base 902 shown extending up into edge 1904.

Figure 24:
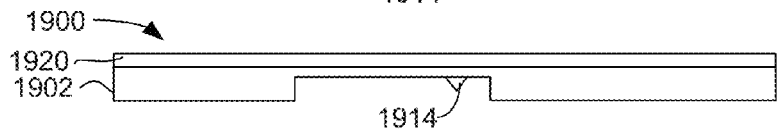
FIG. 24 is a second side elevation view illustrating the sixth exemplary embodiment of the tape rule accessory of FIG. 19, according to a preferred embodiment of the present invention.

FIG. 24 is a second side elevation view illustrating the sixth exemplary embodiment of the tape rule accessory 1900 of FIG. 19, according to a preferred embodiment of the present invention. This figure illustrates the lip 1920 view. The slot opening 1908 is not visible because the top flange 1912 does not rise above lip 1920.

Figure 25:
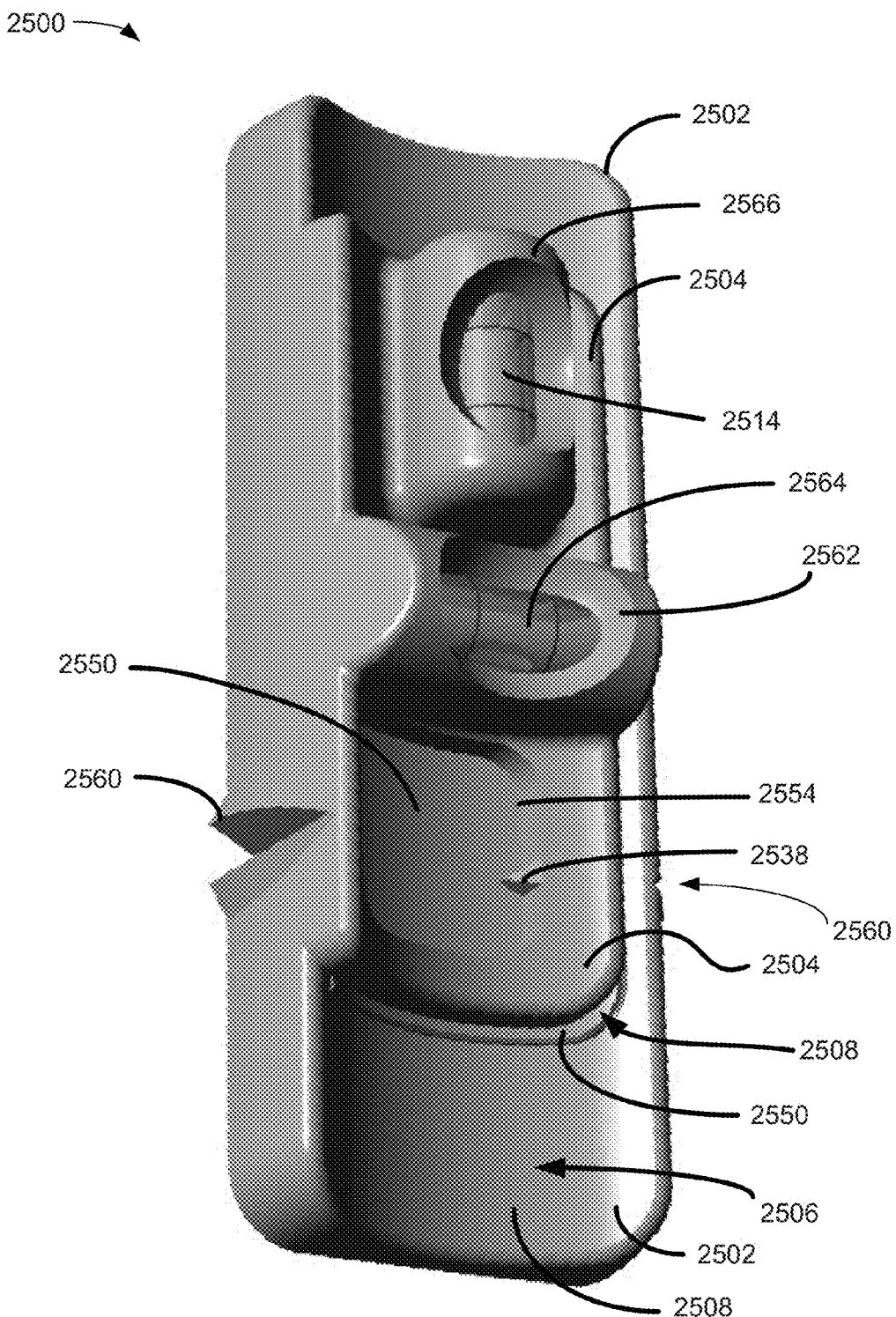
FIG. 25 is a top-side perspective view illustrating the seventh exemplary embodiment of the tape rule accessory, according to a preferred embodiment of the present invention.

FIG. 25 is a top-side perspective view illustrating the seventh exemplary embodiment of the tape rule accessory 2500, according to a preferred embodiment of the present invention. Tape rule accessory 2500 is made in two portions 2502 and 2802 (see FIG. 28) of injection molded plastic which are then thermally bonded together. Top portion 2502 includes upper lip 2504 (similar to top flange 104) which supports first level indicator housing 2566 and first level indicator 2514 as well as second level indicator housing 2562 and second level indicator 2564. Level indicators 2512 and 2564, exemplified here as cylindrical spirit levels 114, are press fit into their respective housings from underneath, as will be discussed further below. In another embodiment, level indicators 2512 and 2564 may be replaced by a single hemispherical spirit level as an omni-directional level indicator. Upper lip 2504 frames window 2554, through which tape support panel 2550 can be seen. Tape support panel 2550 in panel opening 2602 (see FIG. 26) is the only portion of lower part 2802 (see FIG. 28) visible in this view. In operation, a portion of the tape rule 902 is visible in window 2554 as in FIG. 10. Window 2554 has opposed and visual aligned alignment pointers 2538 (one of two is visible in this view) which further align to opposed and aligned marking guides 2560. Marking guides 2560 align in depth to where the edge of tape rule 902 would be, were it not installed in the tape rule accessory 2500, such that a sharp pencil placed into the marking slot 2560 will make a mark that will accurately reflect a measurement made at the edge of the tape rule 902. Slot opening 2508 between tape support panel 2550 and upper lip 2504 runs the length of upper lip 2504 and receives tape rule 902 by sideways insertion.

Top portion 2502 has a first support 2508 having a central longitudinal axis and a curved top surface 2506, two long sides and two ends. Top portion 2502 has a second support 2504, or upper lip 2504, extending from a first long side of the first support 2508 and further extending over, in a conformally arcuate and spaced part relationship, at least a portion of the first support 2508 and extending to a line near the second long side, where the spaced apart relationship creates a curved slot operable to frictionally receive a curved tape rule 902 by sideways insertion. A clamping device, or lock, such as set screw 802, may be installed in second support 2504 in a particular embodiment.

Figure 26:
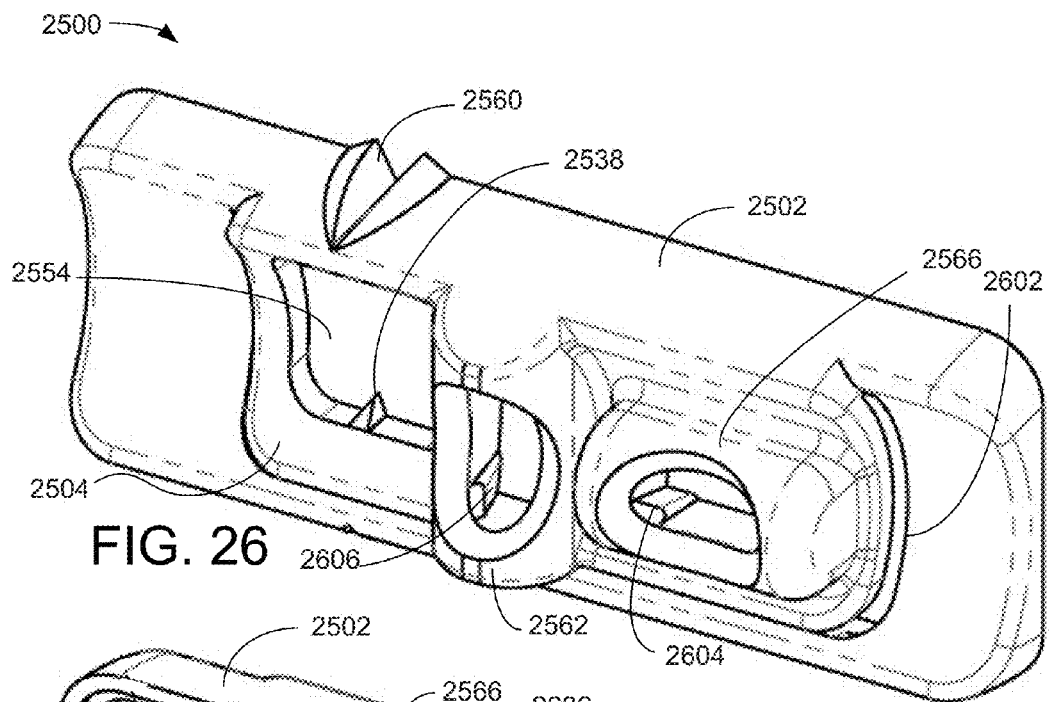
FIG. 26 is a top-side perspective view illustrating a top portion of the seventh exemplary embodiment of the tape rule accessory of FIG. 25, according to a preferred embodiment of the present invention.

FIG. 26 is a top-side perspective view illustrating a top portion 2502 of the seventh exemplary embodiment of the tape rule accessory 2500 of FIG. 25, according to a preferred embodiment of the present invention. An edge of panel opening 2602, which receives tape support panel 2550, can be seen in this view. First snap fitting 2604 (one of four visible) can be seen in first level indicator housing 2566. Second snap fitting 2606 (one of four visible) can be seen in second level indicator housing 2652.

Figure 27:
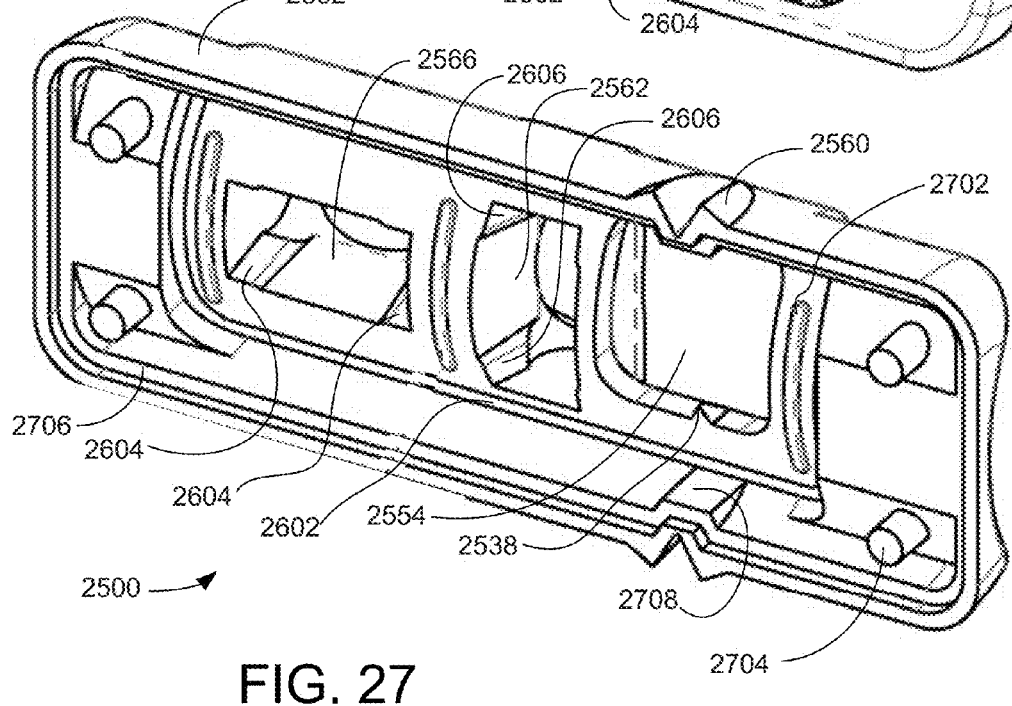
FIG. 27 is a bottom-side perspective view illustrating the top portion of the seventh exemplary embodiment of the tape rule accessory of FIG. 25, according to a preferred embodiment of the present invention.

FIG. 27 is a bottom-side perspective view illustrating the top portion 2502 of the seventh exemplary embodiment of the tape rule accessory 2500 of FIG. 25, according to a preferred embodiment of the present invention. Friction ridges 2702 (one of three labeled) frictionally engage the tape rule 902 during operation, providing sufficient grip on the tape rule 902 to prevent accidental sliding while still providing ease of use. Additional snap fittings 2604 and 2606 can be seen in this view. Thermal stakes 2704 (one of four labeled) are received in holes 2808 (see FIG. 28) in bottom portion 2802 and melted to form a bond between top portion 2502 and bottom portion 2802. Receiving surface 2706 around the inner perimeter of top portion 2502 abuts a complimentary flange 2804 (see FIG. 8) of bottom portion 2802 during assembly. Alignment keys 2708 (one of two labeled) assist in aligning notches 2806 of bottom portion 2802 to top portion 2502.

Figure 28:
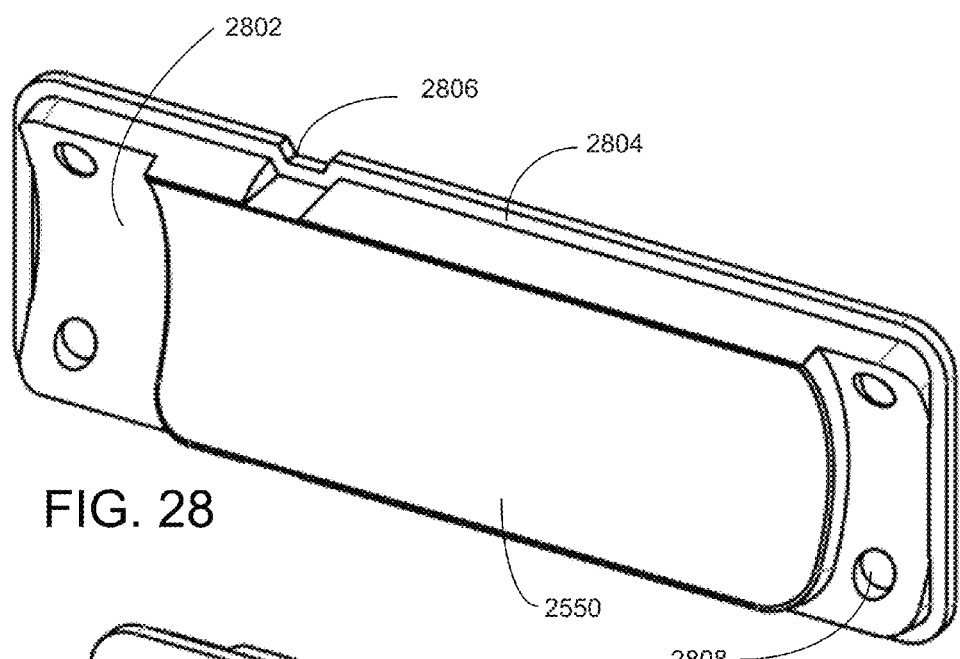
FIG. 28 is a top-side perspective view illustrating a bottom portion of the seventh exemplary embodiment of the tape rule accessory of FIG. 25, according to a preferred embodiment of the present invention.

FIG. 28 is a top-side perspective view illustrating a bottom portion 2802 of the seventh exemplary embodiment of the tape rule accessory 2500 of FIG. 25, according to a preferred embodiment of the present invention. Holes 2808 (one of four labeled) each receive a thermal stake 2704 for thermally bonding the top portion 2502 to the bottom portion 2802. Tape support panel 2550 has a curvature that is complimentary to that of steel tape rules 902. Notches 2806 receive alignment keys 2708 when the tape rule accessory 2500 is assembled. Perimeter flange 2804 abuts receiving surface 2706 when the tape rule accessory 2500 is assembled.

Figure 29:
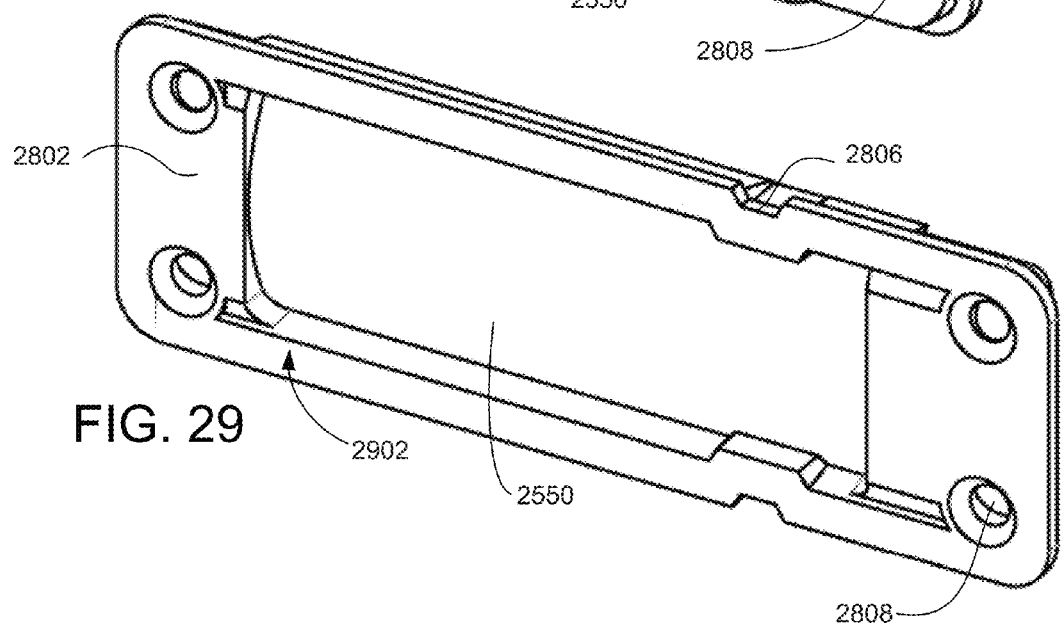
FIG. 29 is a bottom-side perspective view illustrating the bottom portion of the seventh exemplary embodiment of the tape rule accessory of FIG. 25, according to a preferred embodiment of the present invention.

FIG. 29 is a bottom-side perspective view illustrating the bottom portion 2802 of the seventh exemplary embodiment of the tape rule accessory 2500 of FIG. 25, according to a preferred embodiment of the present invention. The underside of tape support panel 2550 is also curved. In another embodiment, the bottom surface may not be curved. The underside of bottom portion 2802 will become the bottom surface of the tape rule accessory 2500. The underside of bottom portion 2802 has a flat surface 2902 at least around the perimeter for stabilizing the tape rule accessory 2500 on a working surface, such as a table, wall, or lumber.

Figure 30:
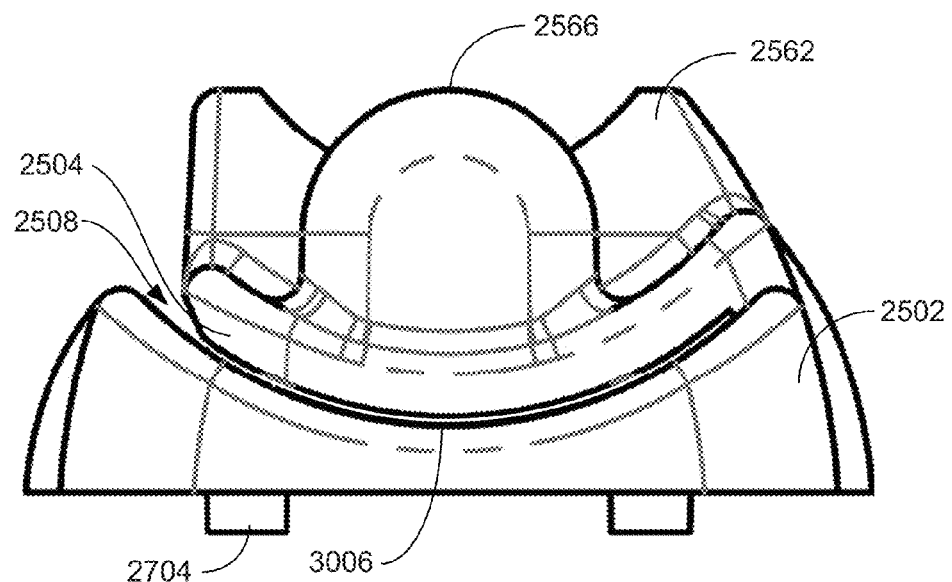
FIG. 30 is an end elevation view illustrating the top portion of the seventh exemplary embodiment of the tape rule accessory of FIG. 25, according to a preferred embodiment of the present invention.

FIG. 30 is an end elevation view illustrating the top portion 2502 of the seventh exemplary embodiment of the tape rule accessory 2500 of FIG. 25, according to a preferred embodiment of the present invention. The tape rule 902 is inserted sideways through opening 2508 and into slot 3006 below upper lip 2504 and, when assembled, above tape support panel 2550.

Figure 31:
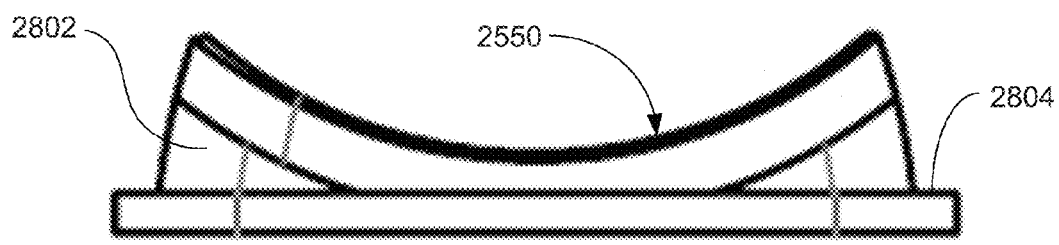
FIG. 31 is an end elevation view illustrating the bottom portion of the seventh exemplary embodiment of the tape rule accessory of FIG. 25, according to a preferred embodiment of the present invention.

FIG. 31 is an end elevation view illustrating the bottom portion 2802 of the seventh exemplary embodiment of the tape rule accessory 2500 of FIG. 25, according to a preferred embodiment of the present invention. The curvature of tape support panel 2550 can be more clearly seen in this view.

Figure 32:
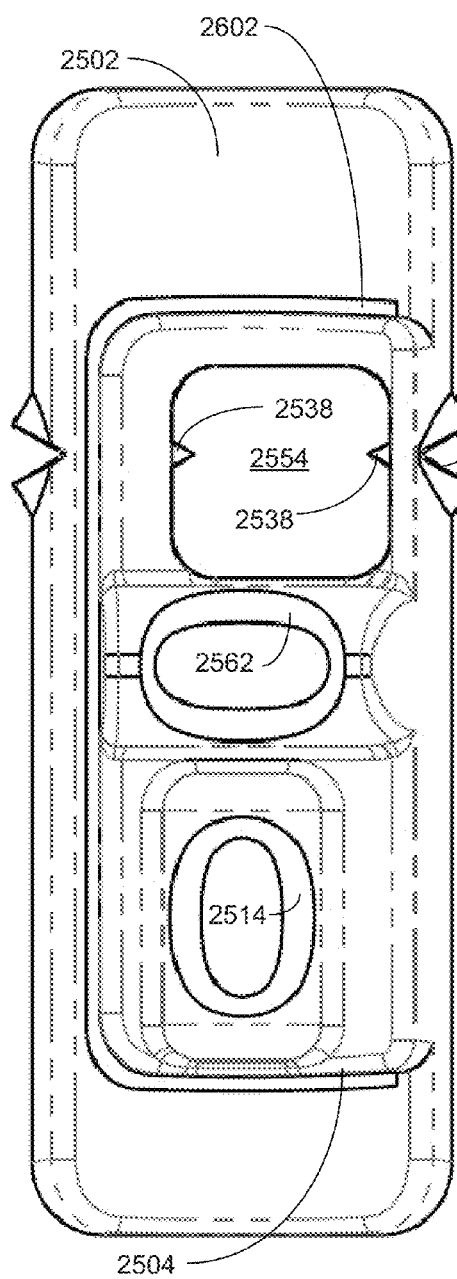
FIG. 32 is a top plan view illustrating a top portion of the seventh exemplary embodiment of the tape rule accessory of FIG. 25, according to a preferred embodiment of the present invention.

FIG. 32 is a top plan view illustrating a top portion 2502 of the seventh exemplary embodiment of the tape rule accessory 2500 of FIG. 25, according to a preferred embodiment of the present invention. FIG. 32 is provided to assist in enabling the invention.

Figure 33:
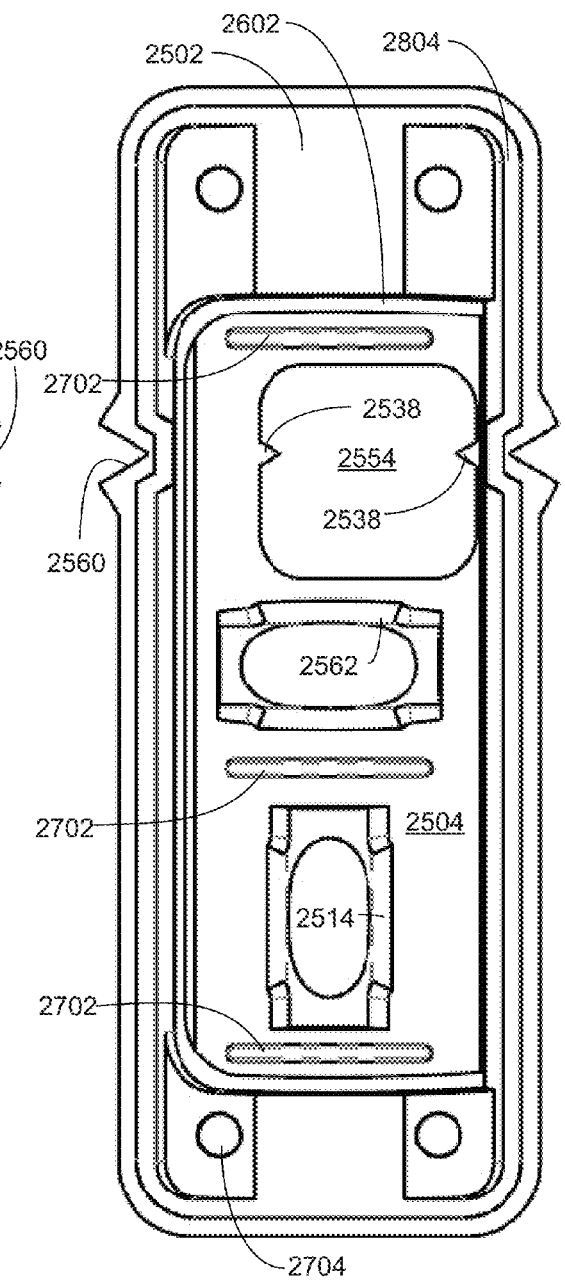
FIG. 33 is a bottom plan view illustrating the top portion of the seventh exemplary embodiment of the tape rule accessory of FIG. 25, according to a preferred embodiment of the present invention.

FIG. 33 is a bottom plan view illustrating the top portion 2502 of the seventh exemplary embodiment of the tape rule accessory 2800 of FIG. 25, according to a preferred embodiment of the present invention. FIG. 33 is provided to assist in enabling the invention.

FIG. 34 is a side elevation view illustrating the top portion 2502 of the seventh exemplary embodiment of the tape rule accessory 2500 of FIG. 25 and defining a cross sections BB, according to a preferred embodiment of the present invention. FIG. 34 is provided to assist in enabling the invention.

FIG. 35 is a cross-sectional view illustrating the top portion 2502 of the seventh exemplary embodiment of the tape rule accessory 2500 of FIG. 25 and through cross sections BB of FIG. 34, according to a preferred embodiment of the present invention. The extension of upper lip 2504 from top portion 2502 can be more clearly seen.

Figure 36:
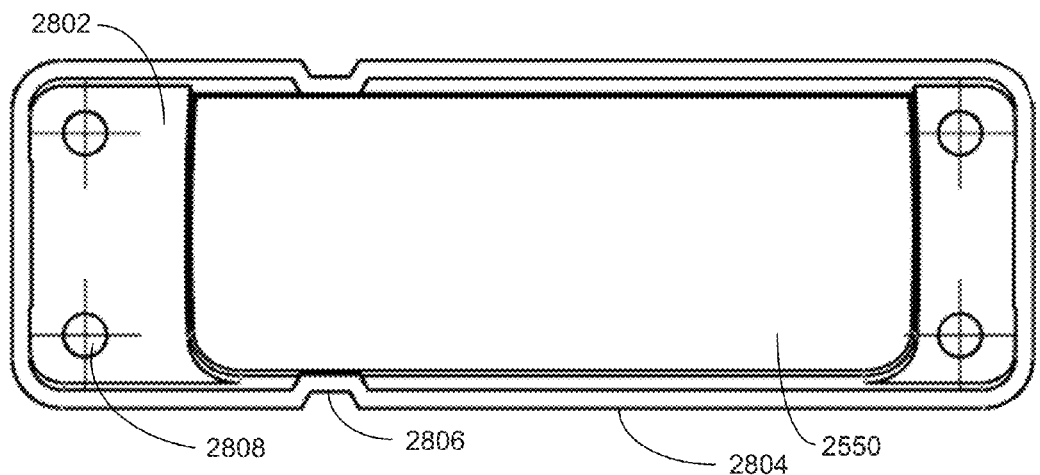
FIG. 36 is a top plan view illustrating the bottom portion of the seventh exemplary embodiment of the tape rule accessory of FIG. 25, according to a preferred embodiment of the present invention.

FIG. 36 is a top plan view illustrating the bottom portion 2802 of the seventh exemplary embodiment of the tape rule accessory 2500 of FIG. 25, according to a preferred embodiment of the present invention. FIG. 36 is provided to assist in enabling the invention.

Figure 37:
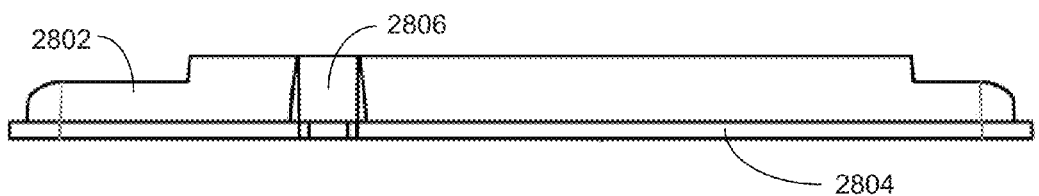
FIG. 37 is a side elevation view illustrating the bottom portion of the seventh exemplary embodiment of the tape rule accessory of FIG. 25, according to a preferred embodiment of the present invention.

FIG. 37 is a side elevation view illustrating the bottom portion 2802 of the seventh exemplary embodiment of the tape rule accessory 2500 of FIG. 25, according to a preferred embodiment of the present invention. FIG. 37 is provided to assist in enabling the invention.

Figure 38:
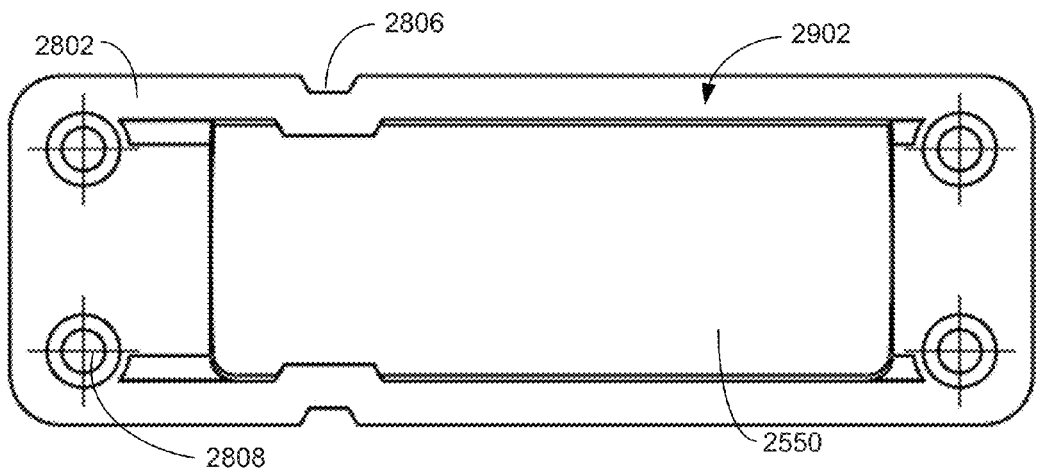
FIG. 38 is a bottom plan view illustrating the bottom portion of the seventh exemplary embodiment of the tape rule accessory of FIG. 25, according to a preferred embodiment of the present invention.

FIG. 38 is a bottom plan view illustrating the bottom portion 2802 of the seventh exemplary embodiment of the tape rule accessory 2500 of FIG. 25, according to a preferred embodiment of the present invention. The underside of bottom portion 2802 has a flat surface 2902 at least around the perimeter for stabilizing the tape rule accessory 2500 on a working surface, such as a table, wall, or lumber.

Figure 39:
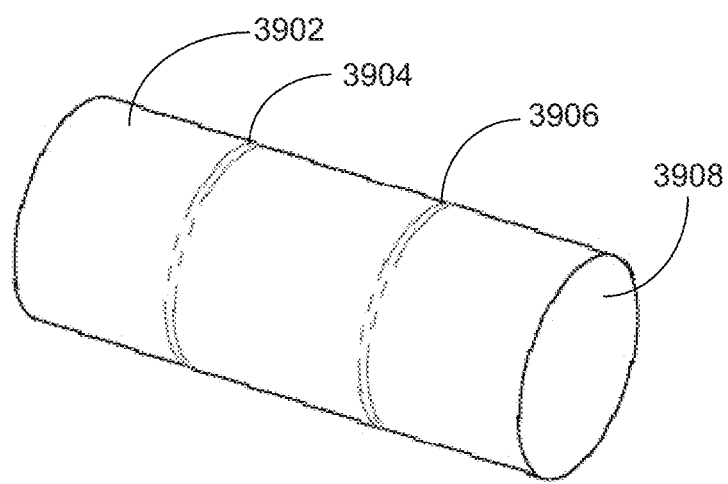
FIG. 39 is a perspective view illustrating an exemplary spirit level cylinder of the seventh exemplary embodiment of the tape rule accessory of FIG. 25, according to a preferred embodiment of the present invention.

FIG. 39 is a perspective view illustrating an exemplary spirit level cylinder 3902 of the seventh exemplary embodiment of the tape rule accessory 2500 of FIG. 25, according to a preferred embodiment of the present invention. Spirit level cylinder 3902 has demarcation lines 3904 and 3906 for aligning a bubble in a fluid within the cylinder. Cylinder end 3908 is shown as an end to a right circular cylinder, but the invention is not so limited. In another embodiment, the end may be a dome of hemispherical or semi-ellipsoidal shape.

In assembly, the top portion 2502 and bottom portion 2802 are formed by injection molding or similarly effective process. Spirit levels 2514 and 2564 are snap fit into their respective housings 2566 and 2562 from the underside of top portion 2502. Bottom portion 2802 and top portion 2502 are joined together via thermal bonding or similarly effective method, thereby forming the tape rule accessory 2500.

While the invention has been disclosed by multiple exemplary embodiments, the invention is not limited to these embodiments. Other processes for forming bottom portion 2802 and top portion 2502 may be used in other embodiments. For non-limiting examples, machining, 3D printing, and non-injection molding. Various materials may be used in various additional embodiments, including, for non-limiting example, a wide variety of metals and alloys, plastics, ceramics, and composites. Some variation in design features, such as, without limitation, an embodiment with only one level (2514 or 2464) is within the scope of the invention. Various dimensions may be used. For example, the distance between a line connecting the alignment pointers 2538 and either or both ends of the tape rule accessory 2500 may be an integer number of inches. For another example, the distance between a line connecting the alignment pointers 2538 and either or both ends of the tape rule accessory 2500 may be an integer number of centimeters.

I claim:

1. A tape rule accessory for a tape rule, comprising:
   a. a first support having first and second opposing long sides, first and second ends, a longitudinal axis and a top surface curvature about said first longitudinal axis;
   b. a second support extending from said first long side of said first support and further extending over, in a conformally arcuate and spaced part relationship, at least a portion of said first support extending to a line proximate said second long side, wherein said spaced apart relationship comprises a curved slot operable to frictionally receive a curved tape rule by sideways insertion; and
   c. at least one level indicator attached at least partially to one of said first support and said second support.

2. The tape rule accessory of claim 1, comprising at least one window opening in said second support sized to enable reading of a portion of said curved tape rule, when in use.

3. The tape rule accessory of claim 2, comprising first and second aligned and opposed visual alignment pointers extending into said window opening.

4. The tape rule accessory of claim 3, further comprising first and second aligned and opposed marking guides aligned to said visual alignment pointers and positioned on said first and second long sides, respectively, and each said marking guide having a depth aligned to an edge of said tape rule, when said tape rule is installed.

5. The tape rule accessory of claim 3, wherein said first and second aligned and opposed alignment pointers are positioned an integer number of tape rule length units from at least one of said first end and said second end.

6. The tape rule accessory of claim 2, comprising at least one of an alignment bar extending across said at least one window and a lock for releasably fastening said tape rule in said tape rule accessory.

7. The tape rule accessory of claim 6, wherein an edge of said alignment bar is positioned an integer number of length units from at least one of said first end and said second end.

8. The tape rule accessory of claim 1, wherein said at least one level indicator comprises a first spirit level aligned to said longitudinal axis and a second spirit level aligned perpendicular to said longitudinal axis.

9. The tape rule accessory of claim 1, comprising:
 a. a top portion including said second support and said first support, wherein said first support includes a panel opening below, and coextensive with, said second support; and
 b. a bottom portion having a curved top surface shaped to fill said panel opening when said bottom portion is attached to said top portion.

10. The tape rule accessory of claim 9, comprising at least one level indicator housing extending from said second support, further comprising:
 a. a top housing opening for viewing said level indicator;
 b. at least one snap fitting within said housing operable to assist in snap fitting said level indicator into said at least one level indicator housing; and
 c. a bottom level indicator housing opening in the underside of said top portion, operable to receive said level indicator to be snap fit into said level indicator housing.

11. The tape rule accessory of claim 9, comprising at least one friction ridge extending from an underside of said second support and operable to frictionally engage said tape rule during operation.

12. The tape rule accessory of claim 9, comprising;
 a. a plurality of thermal stakes extending from an underside of said top portion;
 b. said plurality of holes in said bottom portion, alignable to said thermal stakes; and
 c. where said thermal stakes are operable to assist in thermally bonding said top portion to said bottom portion.

13. A tape rule accessory for a tape rule, comprising:
 a. a first support having first and second opposing long sides, first and second ends, a longitudinal axis and a top surface curvature about said first longitudinal axis;
 b. a second support extending from said first long side of said first support and further extending over, in a conformally arcuate and spaced part relationship, at least a portion of said first support extending to a line proximate said second long side, wherein said spaced apart relationship comprises a curved slot operable to frictionally receive a curved tape rule by sideways insertion;
 c. at least one level indicator attached at least partially to one of said first support and said second support;
 d. at least one window opening in said second support sized to enable reading of a portion of said curved tape rule, when in use; and
 e. first and second aligned and opposed visual alignment pointers extending into said window opening.

14. The tape rule accessory of claim 13, further comprising first and second aligned and opposed marking guides aligned to said visual alignment pointers and positioned on said first and second long sides, respectively, and each said marking guide having a depth aligned to an edge of said tape rule, when said tape rule is installed.

15. The tape rule accessory of claim 13, wherein said first and second aligned and opposed alignment pointers are positioned an integer number of tape rule length units from at least one of said first end and said second end.

16. The tape rule accessory of claim 13, comprising:
 a. a top portion including said second support and said first support, wherein said first support includes a panel opening below, and coextensive with, said second support;
 b. a bottom portion having a curved top surface shaped to fill said panel opening when attached to said top portion;
 c. at least one level indicator housing extending from said second support, further comprising:
  i. a top housing opening for viewing said level indicator;
  ii. at least one snap fitting operable to assist in snap fitting said level indicator into said at least one level indicator housing; and
  iii. a bottom level indicator housing opening in the underside of said top portion, operable to receive said level indicator to be snap fit into said level indicator housing.

17. The tape rule accessory of claim 13, comprising at least one friction ridge extending from an underside of said second support and operable to frictionally engage said tape rule during operation.

18. A tape rule accessory comprising:
 a. a first support having first and second opposing long sides, first and second ends, a longitudinal axis and a top surface curvature about said first longitudinal axis;
 b. a second support extending from said first long side of said first support and further extending over, in a conformally arcuate and spaced part relationship, at least a portion of said first support extending to a line proximate said second long side, wherein said spaced apart relationship comprises a curved slot operable to frictionally receive a curved tape rule by sideways insertion;
 c. at least one level indicator attached at least partially to one of said first support and said second support;
 d. at least one window opening in said second support sized to enable reading of a portion of said curved tape rule, when in use;
 e. first and second aligned and opposed visual alignment pointers extending into said window opening;
 f. first and second aligned and opposed marking guides aligned to said visual alignment pointers and positioned on said first and second long sides, respectively, and each said marking guide having a depth aligned to an edge of said tape rule, when said tape rule is installed; and
 g. wherein said first and second aligned and opposed alignment pointers are positioned an integer number of tape rule length units from at least one of said first end and said second end.

19. The tape rule accessory of claim 18, comprising:
 a. a top portion including said second support and said first support, wherein said first support includes a panel opening below, and coextensive with, said second support;

b. a bottom portion having a curved top surface shaped to fill said panel opening when attached to said top portion;
c. at least one level indicator housing extending from said second support, further comprising:
  i. a top housing opening for viewing said level indicator;
  ii. at least one snap fitting operable to assist in snap fitting said level indicator into said at least one level indicator housing; and
  iii. a bottom level indicator housing opening in the underside of said top portion, operable to receive said level indicator to be snap fit into said level indicator housing.

20. The tape rule accessory of claim 18, comprising at least one friction ridge extending from an underside of said second support and operable to frictionally engage said tape rule during operation.

\* \* \* \* \*